(12) United States Patent
Puzzonia

(10) Patent No.: US 8,789,849 B2
(45) Date of Patent: Jul. 29, 2014

(54) DUAL DEPTH AIRBAG

(75) Inventor: John Pasquale Puzzonia, Macomb, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/473,520

(22) Filed: May 16, 2012

(65) Prior Publication Data

US 2012/0292897 A1  Nov. 22, 2012

Related U.S. Application Data

(60) Provisional application No. 61/487,056, filed on May 17, 2011.

(51) Int. Cl.
*B60R 21/2334* (2011.01)

(52) U.S. Cl.
USPC .......................... 280/743.2; 280/729; 280/742

(58) Field of Classification Search
USPC ................................ 280/729, 736, 742, 743.2
See application file for complete search history.

(56) References Cited

U.S. PATENT DOCUMENTS

| | | | | |
|---|---|---|---|---|
| 3,788,663 A * | 1/1974 | Weman | ........................ | 280/729 |
| 3,843,150 A * | 10/1974 | Harada et al. | ................. | 280/729 |
| 5,542,695 A * | 8/1996 | Hanson | ........................ | 280/729 |
| 5,737,083 A | 4/1998 | Owechko et al. | | |
| 6,151,540 A | 11/2000 | Anishetty | | |
| 6,260,877 B1 * | 7/2001 | Rasmussen, Sr. | ............. | 280/729 |
| 6,578,871 B2 | 6/2003 | Gray et al. | | |
| 6,702,320 B1 * | 3/2004 | Lang et al. | ..................... | 280/729 |
| 6,766,271 B2 | 7/2004 | Griffin et al. | | |
| 7,093,854 B2 * | 8/2006 | Fischer et al. | ............. | 280/743.2 |
| 7,333,023 B2 | 2/2008 | Murad et al. | | |
| 7,347,445 B2 * | 3/2008 | Choi | ............................. | 280/729 |
| 7,415,126 B2 | 8/2008 | Breed et al. | | |
| 7,503,583 B2 * | 3/2009 | Muller | ....................... | 280/743.1 |
| 7,630,804 B2 | 12/2009 | Aoki et al. | | |
| 7,637,528 B2 * | 12/2009 | Shimazaki et al. | ......... | 280/728.2 |
| 7,673,899 B2 * | 3/2010 | Abe | .............................. | 280/742 |
| 2008/0080741 A1 | 4/2008 | Yokoo et al. | | |

* cited by examiner

*Primary Examiner* — Ruth Ilan
*Assistant Examiner* — Timothy Wilhelm
(74) *Attorney, Agent, or Firm* — Foley & Lardner LLP

(57) ABSTRACT

An airbag module for a vehicle including an inflatable airbag cushion, an inflator configured to inflate the airbag cushion, an inflatable tube having a fixed first end and a second end, and a second inflator configured to inflate the tube. The second end of the tube is configured to be coupled to a portion of the airbag cushion. The tube has a first length when not inflated and a second length when inflated. When in a first mode of operation, the airbag cushion is configured to deploy to a first depth that is restrained by the first length of the tube. When in a second mode of operation, the airbag cushion is configured to deploy to a second depth that is restrained by the second length of the tube.

21 Claims, 3 Drawing Sheets

US 8,789,849 B2

DUAL DEPTH AIRBAG

CROSS-REFERENCE TO RELATED PATENT APPLICATIONS

The present application claims the benefit of and priority to U.S. Provisional Patent Application No. 61/487,056, filed May 17, 2011. U.S. Provisional Patent Application No. 61/487,056 is incorporated by reference herein in its entirety.

BACKGROUND

The present application relates generally to the field of airbag modules for use in vehicles to restrain occupants. More specifically, this application relates to an airbag module having an inflatable airbag cushion that is configured to deploy to more than size (e.g., depth).

Airbags are provided in vehicles to provide a degree of protection to an occupant of a vehicle, such as by inflating when a collision or accident occurs with the vehicle.

Conventional airbags are generally designed to inflate to a single size. However, such single size designs may not account for the range of occupant sizes. For example, a large occupant (e.g., a 95% occupant, an adult male occupant) is significantly larger than a child or a small occupant (e.g., a 5% occupant). In addition, the sizes of occupants in a given class (such as adult male, adult female, child, etc.) can vary. In addition, single size airbags may not account for occupants who are out of position (such as sitting far forward in a vehicle seat) or account for child safety seats. Accordingly, it would be advantageous to provide an airbag module that controls the size (e.g., depth) of the deploying airbag based on size and/or position of the occupant to tailor the airbag performance to the restrained occupant.

SUMMARY

One embodiment relates to an airbag module or system for a vehicle. The airbag system includes an inflatable airbag cushion, an inflator configured to inflate the airbag cushion, an inflatable tube having a fixed first end and a second end, and a second inflator configured to inflate the tube. The second end of the tube is configured to be coupled to a portion of the airbag cushion. The tube has a first length when not inflated and a second length when inflated. When in a first mode of operation, the airbag cushion is configured to deploy to a first depth that is restrained by the first length of the tube. When in a second mode of operation, the airbag cushion is configured to deploy to a second depth that is restrained by the second length of the tube.

Another embodiment relates to an occupant restraint system for a vehicle. The occupant restrain system includes an airbag module and an occupant classification system. The airbag module includes an inflatable airbag cushion, an inflator configured to inflate the airbag cushion, an inflatable tube having a fixed first end and a second end configured to be coupled to a portion of the airbag cushion, and a second inflator configured to inflate the tube. The tube has a first length when not inflated and a second length when inflated. The occupant classification system is configured to detect at least one of a size and a position of an occupant of the vehicle, wherein depending on the at least one of the size and position of the occupant, the airbag cushion is configured to deploy to one of a first depth and a second depth. When deployed at the first depth, the airbag cushion is restrained by the first length of the tube. When deployed at the second depth, the airbag cushion is restrained by the second length of the tube.

Yet another embodiment relates to an airbag module or system for a vehicle. The airbag system includes an inflatable airbag cushion, a first inflator configured to inflate the airbag cushion, an inflatable tube having a fixed first end and a second end configured to be coupled to a portion of the airbag cushion, and a second inflator configured to inflate the tube. When the first inflator is activated, the airbag cushion is configured to deploy to a first size that is restrained by a first length of the tube. When the first and second inflators are activated, the airbag cushion is configured to deploy to a second depth that is restrained by a second length of the tube.

The airbag cushions of the airbag systems are configured to accommodate occupants of various sizes and in various positions. Such airbag cushions and airbag systems may provide a tailored restraint to the occupant to increase and/or optimize the amount of safety for occupants of various sizes. In addition, the airbag cushions and airbag systems may accommodate out of position occupants and child safety seats located in a vehicle seat.

DETAILED DESCRIPTION

The automotive industry is increasing trending towards more adaptive features in airbag systems to accommodate occupants of various sizes and in various positions. By controlling the depth or size of an airbag, an airbag can advantageously accommodate such occupants while providing a degree of protection.

With general reference to the Figures, disclosed herein are airbag modules or systems having an inflatable airbag cushion configured to accommodate occupants of various sizes and in various positions by being able to deploy to more than size. For example, a front-impact airbag module may be configured to include an inflatable cushion that is capable of deploying to a first size (e.g., first depth) and a second size (e.g., second depth) depending on parameters related to the occupant, such as occupant size and position within the vehicle. The airbag module may include an inflatable tube that is configured to restrain deployment of the airbag cushion to a first size when the tube is not inflated and to restrain deployment of the airbag cushion to a second size when the tube is inflated.

Figure 1:
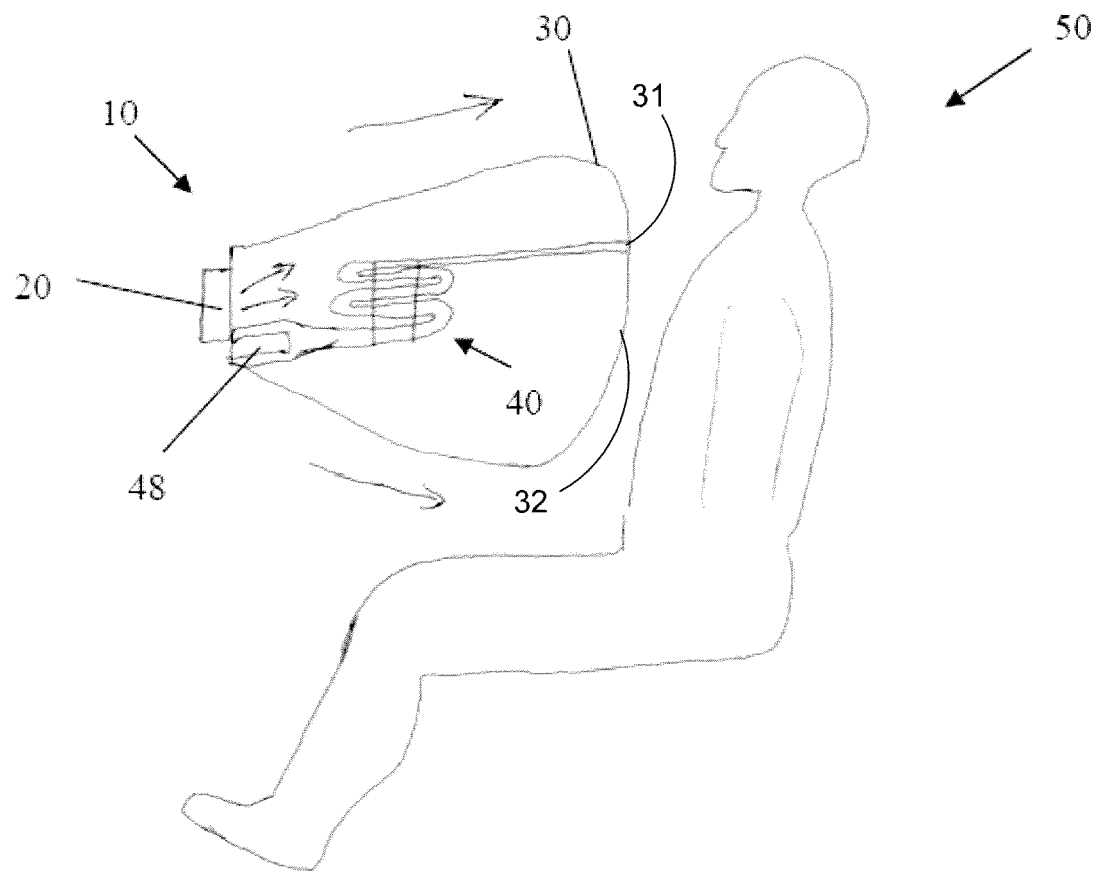
FIG. 1 is a side sectional view of an exemplary embodiment of an airbag system having a tube.

FIG. 1 illustrates an exemplary embodiment of an airbag module or system 10 having an inflator 20, an inflatable airbag cushion 30, an inflatable tube 40 provided in the airbag cushion 30, and a second inflator 48 (e.g., initiator, micro-gas generator). The inflator 20 is configured to produce inflation gas to inflate the airbag cushion 30 during deployment of the airbag system 10. The second inflator 48 is configured to produce inflation gas to inflate the tube 40. The airbag cushion 30 may include a panel or a plurality of interconnected panels configured as an inflatable chamber to receive the inflation gas from the inflator 20. The panel(s) of the airbag cushion 30 may be made from any suitable material, such as a woven nylon fabric or polyester fabric. The airbag system 10 may also include a housing 46, which may provide structure to the airbag system 10. For example, the airbag cushion 30 may be stored within the housing 46, such that upon deployment, the housing 46 supports the airbag cushion 30 by restraining a fixed end of the airbag cushion 30. The housing 46 may also mount or couple the airbag system 10 to the vehicle, such as the dashboard of the vehicle.

The airbag system 10 may be, for example, a front-impact airbag system configured to restrain an occupant 50 seated in a front seat of a vehicle, such as the driver or passenger of the vehicle. Frontal-impact airbags (e.g., driver-side, passenger-side) are configured to reduce the likelihood of injury sustained by the occupant during vehicle dynamic events. The inflatable airbag cushion 30 may be housed in the airbag system 10 in a stored configuration, such as provided in a dashboard of the vehicle, and may inflate from inflation gas rapidly pushed into the airbag cushion 30 by the inflator 20 or any other suitable inflation (e.g., gas generating) device. The frontal-impact airbag cushion 30 may inflate or deploy to restrain the torso, head, and neck of the restrained occupant, to reduce the likelihood of impact between the occupant and other vehicle components, such as the dashboard or steering wheel. The inflator 20 may use a device, such as a pyrotechnic device or other airbag inflation device, to generate gas almost instantaneously and to push the gas at a high volumetric flow rate into the inflatable airbag cushion of the airbag system to enable the airbag cushion to deploy or inflate over a very short period of time. It is noted that the airbag modules as disclosed herein may include airbag cushions configured to deploy to restrain any portion of a seated occupant and may deploy to any location relative to the occupant. For example, the airbag modules as disclosed herein may be used with side-impact airbags, knee airbags, head-side impact airbags, or any other suitable airbag.

The airbag cushion 30 is configured to deploy to more than one size (e.g., depth) depending on one or more parameters of the occupant (e.g., size, position). For example, the airbag system 10 may be configured to deploy to a first depth corresponding to a first internal volume of the inflatable airbag cushion 30 depending on a first size and/or first position of the occupant, and may be configured to deploy to a second depth corresponding to a second internal volume of the inflatable airbag cushion 30 depending on a second size and/or second position of the occupant. In other words, the airbag system 10 may be configured to operate in one of two modes when activated. It should be noted that the airbag cushions (e.g., airbag cushion 30) as disclosed herein may be configured to deploy to more than two depths, having more than two modes of operation, and the examples disclosed herein are not limiting.

Figure 2:
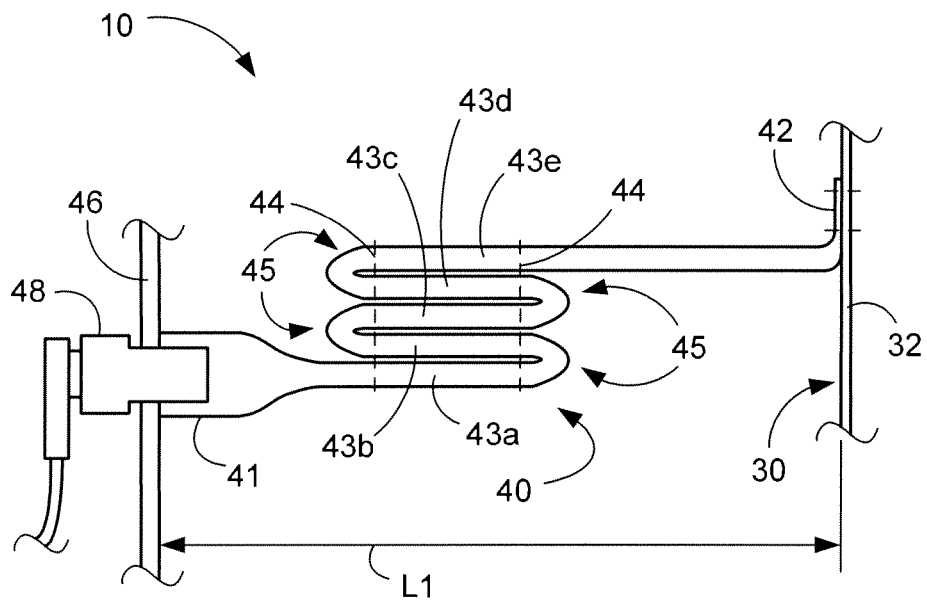
FIG. 2 is a side sectional view of a portion of the airbag system of FIG. 1 shown deployed to a first depth with the tube not inflated.

FIGS. 1 and 2 illustrate the airbag cushion 30 deployed to a first depth, such as when the airbag system 10 is activated to operate in the first mode of operation. When the airbag system 10 is activated in the first mode of operation, the inflator 20 is activated (e.g., initiated) and produces inflation gas that is directed into the airbag cushion 30 to inflate the airbag 30, but the second inflator 48 is not activated so that the tube 40 is not inflated. By not inflating during airbag cushion 30 deployment, the tube 40 acts like a tether to limit the depth and/or size (e.g., volume) of the airbag cushion 30 by restraining a portion 31 of the airbag cushion 30 connected to the tube 40. For example, the portion 31 may be located on a surface 32 of the airbag cushion 30 that leads during deployment. However, the portion 31 may be located anywhere on the airbag cushion 30. The airbag cushion 30 might be limited to a first size and/or depth to provide a first degree of protection, which may be tailored based on the vehicle occupant 50. For example, the airbag cushion 30 may deploy to a first depth because the occupant is a large-sized occupant, the occupant is out of position, or an object (e.g., child seat) is detected in the seat system provided rearward of the airbag system (in vehicle).

Figure 3:
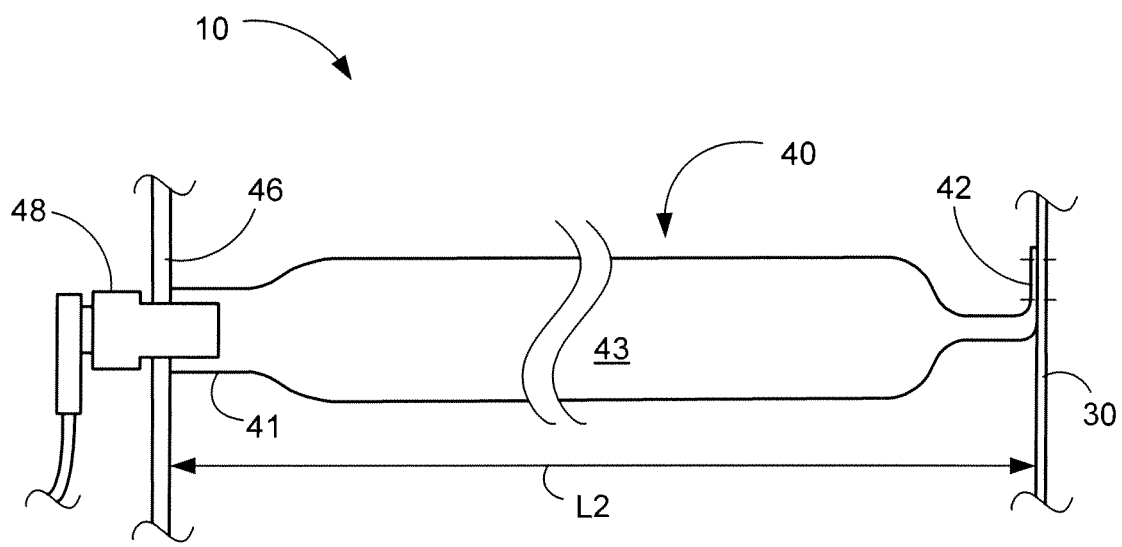
FIG. 3 is a side sectional view of the airbag system of FIG. 2 shown deployed in a second state with the tube inflated.

FIG. 3 illustrates the airbag cushion 30 deployed to a second depth, such as when the airbag system 10 is activated to operate in the second mode of operation. When the airbag system 10 is activated in the second mode of operation, the inflator 20 is activated and produces inflation gas that is directed into the airbag cushion 30 to inflate the airbag cushion 30, and the second inflator 48 is activated and produces inflation gas that is directed into the tube 40 to inflate the tube 40. By inflating the tube 40 during airbag deployment, the tube 40 changes shape (relative to when not inflated) in order to allow the airbag cushion 30 to deploy to the second depth and/or second size to provide a second degree of protection, which may be tailored based on the vehicle occupant 50. For example, the airbag cushion 30 may deploy to the second depth because the occupant is small and/or is located farther away from (e.g., rearward) the stored location of the airbag system 10 and airbag cushion 30.

The tube 40 may be configured as a pressure tube that is configured to inflate from gas generated by the second inflator 48. The tube 40 may be made from a panel or a plurality of panels of any suitable material, such as an airbag material, like a woven nylon fabric or polyester fabric. As shown, the tube 40 includes a first end 41, a second end 42, and a central section 43 that is disposed between the ends 41, 42.

The first end 41 of the tube 40 is configured to receive the inflation gas from the second inflator 48 and may be coupled through any suitable method, such as stitching, adhesive, or a combination thereof, to another component of the airbag system 10, such as the second inflator 48, to the airbag cushion 30, and/or the housing 46. Thus, the first end 41 is configured to be fixed by the other component (e.g., the housing 46). As shown in FIG. 2, the first end 41 is coupled to the housing 46 such that the first end 41 encloses (e.g., is provided around) an outlet of the second inflator 48 so that gas generated by the second inflator 48 is directed directly into the first end 41 of the tube 40.

Figure 4:
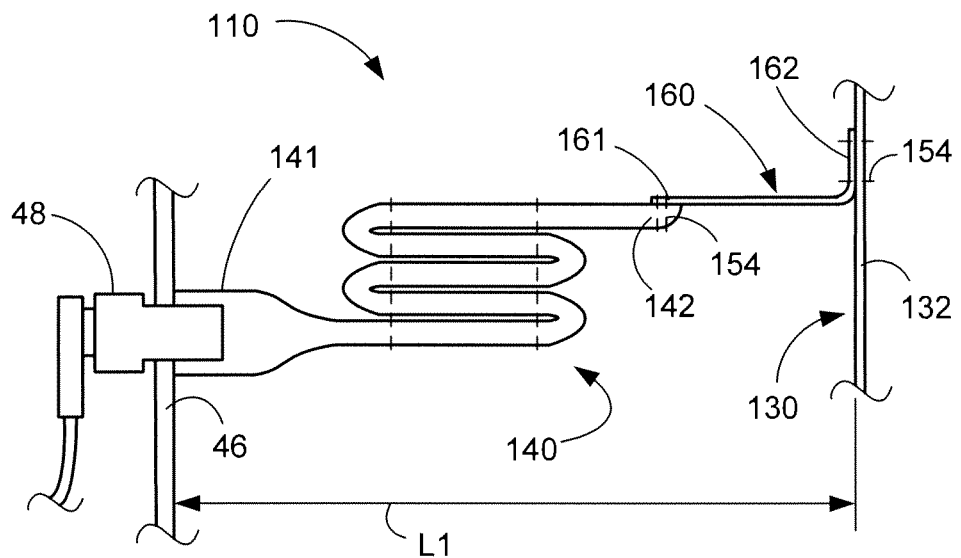
FIG. 4 is a side sectional view of a portion of another exemplary embodiment of an airbag system having a tube and a tether that is shown deployed in a first state where the tube is not inflated.

The second end 42 of the tube 40 is configured to be attached directly or indirectly to a portion of the airbag cushion 30 in order for the tube 40 to influence or control the size and/or the depth of the airbag cushion 30 during deployment. For example, the second end 42 may be attached directly to a portion of the airbag cushion 30, such as to a portion 31 of the surface 32 that leads during deployment, as shown in FIG. 1. Also, for example, the second end 142 may be attached indirectly to a portion of the airbag cushion 130, such as by having a tether 160 provided intermediate or between the tube 140 and the airbag cushion 130, as shown in FIG. 4, where the tether 160 is coupled to both the second end 142 and the surface 132. It should be noted that the second end 42, 142 of the tube 40, 140 may be configured differently than as disclosed herein and still control or influence the airbag cushion 30, 130. The second end 42, 142 may be coupled to the airbag cushion 30 or the tether 160 through any suitable method, such as stitching, adhesive, or a combination thereof.

The tube 40 of the airbag system 10 is configured to control or influence the size and/or the depth of the airbag cushion 30 during deployment. For example, when the airbag system 10 is in the first mode of operation, the tube 40 may act as a tether to limit the size and/or depth of the airbag by being connected to two sides of an airbag 30. In other words, the non-inflated tube 40 may be put into tension when the airbag cushion 30 has deployed to a depth and/or size that is substantially equal to a length of the tube 40 (or the length of the tube and any other connection member, such as a tether), and upon being put into tension the tube 40 restrains further expansion (e.g., depth, size) of the airbag cushion 30.

The tube 40 may include a feature or device to limit the length of the tube 40. For example, the tube 40 may be configured having a fold, a roll, or any other suitable feature, and may also include a connection, such as a stitch, adhesive, or any other suitable connection, to hold two or more portions of the tube 40 together to limit the length of the tube 40. As shown in FIG. 2, the tube 40 may include four folds 45 and a pair of offset stitches 44 to hold the folded sections together. In other words, the four folds 45 may configure the airbag cushion 30 into five adjacent and overlapping central portions 43*a*-43*e* of the central section 43. The stitches 44 may maintain the tube 40 in a first or folded state, such as when the airbag system 10 is in the first mode of operation. In other words, the stitches 44 may maintain a first length of the tube 40 that restrains the deployment of the airbag cushion 30 to the first depth and/or size. The stitches 44 may be configured as tear stitching, which separates or tears at a predetermined threshold force. Thus, the tear stitches 44 of the tube 40 may be configured to tear from the forces induced by the inflation of the tube 40 by the second inflator 48. It should be noted that other devices and means for maintaining the tube 40 in a folded or shortened stated may be used and those disclosed herein are not limiting. For example, one or more than one band (not shown) may be wrapped around the folded tube 40, where the band(s) are configured to separate or tear at a predetermined force or pressure to allow the tube 40 to inflate. Also, for example, one or more than one band may be wrapped around a second tube that is configured to house the folded tube 40, where the band(s) may separate or tear to allow the surrounding tube to move free of tube 40 to no longer restrain the tube 40.

Figure 5:
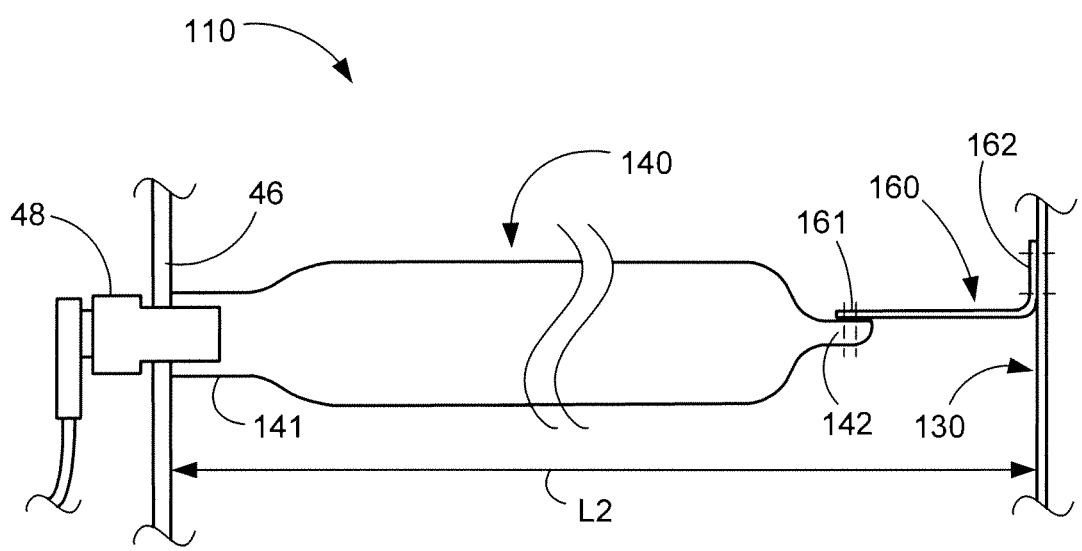
FIG. 5 is a side sectional view of the airbag system of FIG. 4 shown deployed in a second state with the tube inflated.

The airbag system and/or the tube may also include one or more than one tether, such as to couple the tube to a portion of the airbag cushion. As shown in FIGS. 4 and 5, the exemplary embodiment of the airbag system 110 includes a tether 160 having a first end 161 and a second end 162, where the first end 161 of the tether 160 is coupled or connected to the second end 142 of the tube 140 and the second end 162 of the tether 160 is coupled or connected to the surface 132 of the airbag cushion 130, such as to an inner surface. The first end 141 of the tube 140 may be configured to receive inflation gas from the second inflator 48. The arrangement of the airbag system 110 having the tether 160 disposed between the tube 140 and the airbag cushion 130 may reduce the volume of the tube 140 that is configured to be inflated by the second inflator 48, which may advantageously allow for a further reduction in the size of the second inflator 48 and/or may allow the tube 140 to be inflated over a relatively shorter period of time. The tube 140 may also include any combination of the features (e.g., tear stitches) disclosed for the tube 40. According to other examples, the tube of the airbag system may be connected directly to the airbag cushion without the use of tether(s), or may have another device configured to couple the tube to the airbag cushion.

The tube 40 may be configured to maintain a first or shortened state, as shown in the examples of FIGS. 1 and 2, such as when the airbag system 10 operates in the first mode and the tube 40 is not inflated (i.e., remains uninflated). For example, the tube 40 may be sealed so that inflation gas from the inflator 20 does not enter the tube 40 and therefore does not cause the tube 40 to inflate from the inflator 20.

The tube 40 may also be configured to change state, such as to a second or elongated state, as shown in FIG. 3, such as when the airbag system 10 operates in the second mode, to allow the airbag cushion 30 to deploy to the second depth. When the airbag system 10 is activated in the second mode of operation, the inflator 20 inflates the airbag cushion 30, and the second inflator 48 inflates the tube 40, such as to elongate the tube 40, allowing the inflation gas of the inflator 20 to expend the airbag cushion 30, such as from the first depth and/or size to the second depth and/or size.

The second inflator 48 (e.g., initiator) may provide inflation gas to inflate the tube 40. The second inflator 48 may be any suitable device, such as a gas generator which produces a relatively small amount of inflation gas compared to the inflator 20. For example, the second inflator 48 may be a micro gas generator, which may produce a smaller amount of inflation gas than the inflator 20, since the inflatable volume of the tube 40 may be less relative to the inflatable volume of the airbag cushion 30. Such a micro gas generator may advantageously have a smaller packaging size (e.g., volume) relative to the packaging size of the inflator 20.

Once the second inflator 48 has been activated, the second inflator 48 produces inflation gas that is directed into the tube 40 to inflate the tube 40. As the tube 40 inflates, the device maintaining the tube 40 in a shortened and/or folded state is overcome from the forces induced by the inflation gas. For example, the tearing stitches 44 may separate (e.g., tear, come apart, etc.) permitting the tube 40 to inflate and extend to a longer length, such as the second length. When the tube 40 inflates and extends to the longer length, the airbag 30 is also permitted to inflate and extend to a greater depth and/or size due to the inflation gas provided by the inflator 20. As a result, activating the second inflator 48 causes the tube 40 to inflate so that the airbag cushion 30 is no longer restricted or restrained by the tube 40, permitting the airbag cushion 30 to expand to a greater depth or size.

Conversely, if the second inflator 48 is not activated, the tube 40 is not inflated and the airbag cushion 30 is restrained and maintains a smaller depth and/or size, such as shown in the examples of FIGS. 1 and 2.

According to an exemplary embodiment, the airbag system 10 may be configured to control the depth and/or the size of the airbag cushion 30 based on information provided to the airbag system 10. For example, an occupant classification system of a vehicle may be configured to provide information (e.g., data) to the airbag system about a vehicle occupant (e.g., occupant parameters), such as the size and/or position of the occupant. Accordingly, if the occupant classification system of the vehicle detects a relatively large sized occupant or an occupant that is located out of position, then the occupant classification system may provide this information to the airbag system so that the airbag system inflates an airbag to a first, smaller depth and/or size, such as by not inflating a tube (e.g., the tube 40). However, if the occupant classification system detects a relatively small sized occupant or an in-position occupant, then the information from the occupant classification system may result in the airbag cushion inflating to a second, larger depth and/or size.

The occupant classification system may include one or more sensors that are configured to monitor the parameters of the occupant. For example, the occupant classification system may include an occupant mass sensor that is configured to monitor the weight of the seated occupant. Also, for example, the occupant classification system may include an occupant location sensor that monitors the location or position of the seated occupant. The occupant classification system may include a control module or any other suitable controlling device that receives the monitored information (e.g., data) and controls the mode of operation of the airbag system. Accordingly, the control module may be independent from or part of (e.g., integrated within) the airbag system. It is noted that the occupant classification system may be configured differently than the examples as disclosed herein, and the examples are not limiting.

The occupant classification system described above may be any of many different known systems. For example, the occupant classification system may be one of these systems disclosed in U.S. Pat. No. 7,333,023 to Murad et al., U.S. Pat. No. 7,630,804 to Aoki et al., U.S. Pat. No. 7,415,126 to Breed et al., U.S. Pat. No. 6,151,540 to Anishetty, U.S. Pat. No. 6,766,271 to Griffin et al., U.S. Pat. No. 5,737,083 to Owechko et al., U.S. Pat. No. 6,578,871 to Gray et al., or U.S. Patent Application Publication No. 2008/0080741 to Yokoo et al. (the foregoing patents and publications are incorporated by reference herein in their entireties). However, the occupant classification system is not limited to those systems disclosed in the foregoing patents. Any system performing the occupant classification described above would be suitable for use with the dual depth airbag described herein.

According to another example, the airbag system can control the depth or size of an airbag in response to an object in front of the airbag system. For example, if a child safety seat is placed in front of the airbag, the airbag system can be controlled to maintain the airbag at a first, smaller depth or size.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other examples, and that such variations are intended to be encompassed by the present disclosure.

It is important to note that the construction and arrangement of the devices shown in the various examples is illustrative only. Although only a few examples have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative examples. Other substitutions, modifications, changes and omissions may also be made in the design, operating conditions and arrangement of the various examples without departing from the scope of the present invention.

What is claimed is:

1. An occupant restraint system for a vehicle, comprising:
an airbag module that includes:
   an inflatable airbag cushion;
   an inflator configured to inflate the airbag cushion;
   an inflatable tube having a fixed first end and a second end configured to be coupled to a portion of the airbag cushion, the tube has a first length when not inflated and a second length when inflated; and
   a second inflator configured to inflate the tube; and
an occupant classification system configured to detect at least one of a size and a position of an occupant of the vehicle;
wherein depending on the at least one of the size and position of the occupant, the airbag cushion is configured to deploy to one of a first depth and a second depth;
wherein at the first depth, the airbag cushion is restrained by the first length of the tube;
wherein at the second depth, the airbag cushion is restrained by the second length of the tube;
wherein the tube includes a central section having at least two portions that are connected at a connection, such that the connection maintains the first length of the tube when the tube is not inflated, and the connection is released to allow the tube to extend to the second length when the tube is first inflated;
wherein the connection is a tear stitch that is configured to tear when the tube is inflated:
wherein the tear stitch extends through at least four layers of the tube.

2. The occupant restraint system of claim 1, further comprising a tether provided between the tube and the airbag cushion, such that the tether includes a first end and a second end, wherein the first end is coupled to the tube and the second end is coupled to the airbag cushion.

3. The occupant restraint system of claim 1, wherein the portion of the airbag cushion is provided on a leading surface of the airbag cushion during deployment.

4. The occupant restraint system of claim 1, wherein the second inflator is a micro-gas generator.

5. The occupant restraint system of claim 1, wherein the occupant classification system includes at least one of an occupant mass sensor and an occupant position sensor.

6. The occupant restraint system of claim 5, further comprising a control module, which receives a data from the at least one sensor and controls activation of the second inflator based on the data.

7. The occupant restraint system of claim 6, wherein the control module is integrated with the airbag module.

8. An occupant restraint system for a vehicle, comprising:
an airbag module that includes:
   an inflatable airbag cushion;
   an inflator configured to inflate the airbag cushion;
   an inflatable tube having a fixed first end and a second end configured to be coupled to a portion of the airbag cushion, the tube has a first length when not inflated and a second length when inflated; and
   a second inflator configured to inflate the tube;
   a band that is configured to wrap around the tube, wherein the band maintains the first length of the tube when not inflated, and wherein the band allows the tube to expand to the second length when inflated; and an occupant classification system configured to detect at least one of a size and a position of an occupant of the vehicle;

wherein depending on the at least one of the size and position of the occupant, the airbag cushion is configured to deploy to one of a first depth and a second depth;

wherein at the first depth, the airbag cushion is restrained by the first length of the tube;

wherein at the second depth, the airbag cushion is restrained by the second length of the tube.

9. An airbag module for a vehicle, comprising:

an inflatable airbag cushion;

a first inflator configured to inflate the airbag cushion;

an inflatable tube having a fixed first end and a second end configured to be coupled to a portion of the airbag cushion; and a second inflator configured to inflate the tube;

wherein when the first inflator is activated, the airbag cushion is configured to deploy to a first size that is restrained by a first length of the tube;

wherein when the first and second inflators are activated, the airbag cushion is configured to deploy to a second depth that wherein the airbag cushion is restrained by a second length of the tube; and wherein the first inflator does not directly inflate the tube.

10. The airbag module of claim 9, wherein the tube includes a central section having at least two portions that are connected at a connection, such that the connection maintains the first length of the tube when the tube is not inflated, and the connection is released to allow the tube to extend to the second length when the tube is first inflated.

11. The airbag module of claim 10, wherein the connection is a tear stitch that is configured to tear when the tube is inflated.

12. The airbag module of claim 11, wherein the tear stitch extends through at least four layers of the tube.

13. The airbag module of claim 9, further comprising a band configured to wrap around the tube, wherein the band maintains the first length of the tube when the tube is not inflated, and wherein the band allows the tube to expand to the second length when the tube is inflated.

14. An airbag module for a vehicle, comprising:

an inflatable airbag cushion;

an inflator configured to inflate the airbag cushion;

an inflatable tube having a fixed first end and a second end configured to be coupled to a portion of the airbag cushion, the tube having a first length when not inflated and a second length when inflated; and a second inflator configured to inflate the tube;

a band configured to wrap around the tube, wherein the band maintains the first length of the tube when the tube is not inflated, and wherein the band allows the tube to expand to the second length when the tube is inflated;

wherein in a first mode of operation, the deployment of the airbag cushion is restrained by the tube which extends to the first length so that the airbag cushion deploys to a first depth;

wherein in a second mode of operation, the deployment of the airbag cushion is restrained by the tube which extends to the second length the airbag cushion deploys to a second depth.

15. The airbag module of claim 14, wherein the tube includes a central section having at least two portions that are connected.

16. The airbag module of claim 15, wherein in the first mode of operation, the connection maintains the first length of the tube, and wherein in the second mode of operation, the two portions separate to allow the tube to extend to the second length.

17. The airbag module of claim 15, wherein the two portions are connected by a tear stitch that is configured to tear when the tube is first inflated.

18. The airbag module of claim 14, further comprising a tether provided between the tube and the airbag cushion, wherein the tether includes a first end and a second end, and wherein the first end is coupled to the second end of the tube and the second end is coupled to the airbag cushion, and wherein the tether is not inflatable.

19. The airbag module of claim 14, wherein the portion of the airbag cushion coupled to the second end of the tube is located on a leading surface of the airbag cushion during deployment.

20. The airbag module of claim 14, further comprising a housing surrounding the airbag prior to inflation of the airbag, wherein the first end of the tube is fixed to the housing.

21. The airbag module of claim 14, wherein the second inflator is a micro-gas generator.

* * * * *